US008660890B2

(12) United States Patent
Hedley (10) Patent No.: US 8,660,890 B2
(45) Date of Patent: Feb. 25, 2014

(54) ELECTRONIC TOLL MANAGEMENT

(75) Inventor: Jay E. Hedley, Arlington, VA (US)

(73) Assignee: Accenture Global Services Limited, Dublin (IE)

( * ) Notice: Subject to any disclaimer, the term of this patent is extended or adjusted under 35 U.S.C. 154(b) by 310 days.

(21) Appl. No.: 12/367,189

(22) Filed: Feb. 6, 2009

(65) Prior Publication Data

US 2009/0146845 A1 Jun. 11, 2009

Related U.S. Application Data

(63) Continuation of application No. 10/371,549, filed on Feb. 21, 2003, now abandoned.

(51) Int. Cl.
*G07B 15/00* (2011.01)

(52) U.S. Cl.
USPC .............................................. 705/13; 340/928

(58) Field of Classification Search
USPC ........................................... 705/13; 340/928
See application file for complete search history.

(56) References Cited

U.S. PATENT DOCUMENTS

| | | | |
|---|---|---|---|
| 3,825,778 A * | 7/1974 | Ahmed | 307/117 |
| 4,242,661 A | 12/1980 | Henoch et al. | |
| 4,555,618 A * | 11/1985 | Riskin | 235/384 |
| 4,963,723 A | 10/1990 | Masada | |
| 5,349,674 A | 9/1994 | Calvert et al. | |
| 2,163,872 A | 12/1994 | Johsson et al. | |
| 5,392,034 A | 2/1995 | Kuwagaki | |
| 5,638,302 A | 6/1997 | Gerber | |
| 5,740,230 A | 4/1998 | Vaudreuil | |
| 5,745,052 A | 4/1998 | Matsuyama et al. | |
| 5,819,234 A | 10/1998 | Slavin et al. | |
| 5,912,634 A * | 6/1999 | Bunnen et al. | 340/937 |
| 5,920,338 A | 7/1999 | Katz | |
| 6,042,008 A | 3/2000 | Ando et al. | |
| 6,052,068 A | 4/2000 | Price R-W et al. | |
| 6,064,318 A * | 5/2000 | Kirchner et al. | 340/905 |
| 6,081,206 A | 6/2000 | Kielland | |
| 6,088,680 A | 7/2000 | Hoshino et al. | |
| 6,121,898 A | 9/2000 | Moetteli | |
| 6,140,941 A | 10/2000 | Dwyer et al. | |
| 6,167,333 A | 12/2000 | Gehlot | |

(Continued)

FOREIGN PATENT DOCUMENTS

| | | |
|---|---|---|
| CA | 2422187 | 3/2002 |
| DE | 101 04 502 | 8/2002 |

(Continued)

OTHER PUBLICATIONS

Lee Hultgren, Kim Kawada "San Diego's interstate 15 high occupancy/toll lane facility using value pricing"; Institute of Transportation Engineers. ITE Journal. Washington: Jun. 1999. vol. 69. Iss.6; p. 22, 6pgs.*

(Continued)

*Primary Examiner* — Kira Nguyen
(74) *Attorney, Agent, or Firm* — Fish & Richardson P.C.

(57) ABSTRACT

Electronic toll management includes capturing an image of a vehicle triggered by a transaction event representing an interaction between the vehicle and a facility, determining a vehicle identifier based on the captured image, checking whether the vehicle identifier matches a vehicle identifier provided by a party, and notifying the party of an occurrence of a match.

27 Claims, 5 Drawing Sheets

(56) References Cited

U.S. PATENT DOCUMENTS

| | | | |
|---|---|---|---|
| 6,177,885 B1* | 1/2001 | Weil et al. | 701/117 |
| 6,538,580 B2 | 3/2003 | Boström et al. | |
| 6,747,687 B1 | 6/2004 | Alves | |
| 6,892,942 B1 | 5/2005 | Widl et al. | |
| 6,922,156 B2 | 7/2005 | Kavner | |
| 6,959,869 B2 | 11/2005 | Tsikos et al. | |
| 6,966,489 B2* | 11/2005 | Grant | 235/381 |
| 6,999,886 B2 | 2/2006 | Hilliard | |
| 7,119,674 B2 | 10/2006 | Sefton | |
| 7,215,833 B1 | 5/2007 | Tepera et al. | |
| 7,232,064 B1 | 6/2007 | Toohey | |
| 7,407,097 B2 | 8/2008 | Robinson | |
| 2001/0026228 A1 | 10/2001 | Naito | |
| 2002/0072963 A1* | 6/2002 | Jonge | 705/13 |
| 2002/0097178 A1 | 7/2002 | Thomas et al. | |
| 2002/0105440 A1 | 8/2002 | Bostrom et al. | |
| 2002/0140577 A1 | 10/2002 | Kavner | |
| 2002/0140579 A1 | 10/2002 | Kavner | |
| 2002/0140924 A1 | 10/2002 | Wangler et al. | |
| 2002/0141618 A1* | 10/2002 | Ciolli et al. | 382/104 |
| 2002/0198641 A1* | 12/2002 | Halle | 701/35 |
| 2002/0198767 A1 | 12/2002 | Kim | |
| 2003/0011492 A1 | 1/2003 | Owen et al. | |
| 2003/0042304 A1 | 3/2003 | Knowles et al. | |
| 2003/0067396 A1* | 4/2003 | Hassett | 340/825.49 |
| 2003/0189500 A1 | 10/2003 | Lim | |
| 2004/0008368 A1 | 1/2004 | Plunkett et al. | |
| 2004/0008514 A1 | 1/2004 | Lee et al. | |
| 2004/0095258 A1 | 5/2004 | Bosch et al. | |
| 2004/0167861 A1 | 8/2004 | Hedley | |
| 2004/0174272 A1 | 9/2004 | Lin | |
| 2004/0181495 A1 | 9/2004 | Grush | |
| 2004/0233036 A1 | 11/2004 | Sefton | |
| 2005/0197976 A1 | 9/2005 | Tuton et al. | |
| 2006/0056658 A1 | 3/2006 | Kavner | |
| 2006/0064345 A1 | 3/2006 | Biet | |
| 2006/0164258 A1 | 7/2006 | Garibotto et al. | |
| 2006/0258367 A1 | 11/2006 | Chiang | |
| 2007/0124198 A1 | 5/2007 | Robinson et al. | |
| 2007/0252678 A1 | 11/2007 | Alonso et al. | |
| 2007/0299721 A1 | 12/2007 | Robinson et al. | |
| 2008/0231470 A1 | 9/2008 | Ioli | |

FOREIGN PATENT DOCUMENTS

| | | |
|---|---|---|
| GB | 2 344 205 | 5/2000 |
| JP | 2004/213569 | 7/2004 |
| WO | 98/14925 | 4/1998 |
| WO | 99/66455 | 12/1999 |
| WO | 00/46068 | 8/2000 |
| WO | 02/063570 | 8/2002 |
| WO | 03/003314 | 1/2003 |
| WO | 2004/042673 | 5/2004 |
| WO | 2004/075121 | 9/2004 |
| WO | 2007/030446 | 3/2007 |

OTHER PUBLICATIONS

"Life as a moving violation" from the website http://prorev.com/dcmoving.htm, section December Brian Debose, Washington Times, p. 3.* http://www.uspto.gov/web/offices/pac/mpep/documents/2100_2145.htm (7 pages) Jul. 2011.*

Peter Samuel, "Privatization:407 Sold for $2.1 billion—Province Doubles its $s", Apr. 10, 1999. 3 pages.*

International Search and Written Opinion, PCT/IB2006/002738, dated Mar. 12, 2007.

Smith, L Intelligent Transportation Systems—Electronic Toll Collection [online], Jan. 3, 2002 [retrieved on Jul. 11, 2006]. Retrieved from the Internet<URL: http://www.calccit.org/itsdecision/serv_and_tech/Electronic_toll_collection/electronic_toll_collection_rep_print.html >.

Examiner's first report on Australian patent application No. 2004213923.

International Search Report and Written Opinion for International Application No. PCT IB2006/002435.

International Preliminary Examination Report and Written Opinion for International Application No. PCT/EP2004/001644.

First Examination Report for Indian Ref No. 2348/CHENP/2005-CNA.

Canadian Office Action of Application No. 2,516,675, dated Jun. 19, 2008, 4 pages.

Republic of China Office Action of Application No. 200480010404.3 dated Aug. 1, 2008, 18 pages.

Office action in Canadian Application No. 2,516,675, dated Mar. 31, 2009, 6 pages.

Office action in U.S. Appl. No. 11/423,690 mailed Apr. 2, 2009, 22 pages.

China Office Action of Application No. 200680027002.3 dated Jun. 26, 2009, 10 pages.

Search Report and Written Opinion of Application No. SG200718365-0 dated Jul. 23, 2009, 9 pages.

Search Report and Written Opinion of Application No. SG200718336-1 dated Sep. 4, 2009, 8 pages.

McLeod, J., "Automatic highways going the right way?", Electronics, Nov. 28, 1994, 67, 22, 1 page.

"Perle and MFS Network Technologies Partner to Provide Connectivity for New Jersey Toll Road Consortium E-ZPass Project", Business Wire, Jan. 17, 2000.

U.S. Notice of Allowance for U.S. Appl. No. 11/423,683 dated Jan. 27, 2011 (9 pages).

Australian Patent Office Examiner's First Report on Application No. 2006257287 dated Mar. 3, 2011, 3 pages.

European Patent Office Search Report for Application No. 12161598.3-1229 dated May 23, 2012, 5 pages.

EP Office Action for Application No. 04712519.0-1229 dated May 23, 2011, 6 pages.

European Office Action in Application No. 0608926.7, dated Mar. 23, 2010, 6 pages.

Canadian Office Action of Application No. 2,516,675, dated Feb. 20, 2012, 6 pages.

Australian Patent Office Examiner's First Report on Application No. 2010235856 dated Oct. 18, 2011, 1 page.

European Examination Report for Application No. 04712519.0-1953 dated Apr. 9, 2013, 6 pages.

Canadian Office Action for Application No. 2516675 dated Sep. 18, 2013, 6 pages.

John S. Sobolewski, Encyclopedia of Computer Science, 4th ed., ed. By Anthony Ralston, Edwin D. Reilly & David Hemmendinger (London: Nature Publishing Group, 2000) s. v. "networks, computer".

Thomas Narten, revised by James D. Teresco, Encyclopedia of Computer Science, 4th ed., ed. By Anthony Ralston & Edwin D. Reilly & David Hemmendinger (London: Nature Publishing Group, 2000) s.v. "file server".

* cited by examiner

ELECTRONIC TOLL MANAGEMENT

CROSS-REFERENCE TO RELATED APPLICATIONS

This application is a continuation of U.S. application Ser. No. 10/371,549, filed Feb. 21, 2003, which is incorporated herein by reference

BACKGROUND

The present application relates to electronic toll management.

Transportation facilities such as roads, bridges, and tunnels produce tolls often representing a major source of income for many states and municipalities. The large number of automobiles, trucks, and buses stopping at tollbooths to pay a toll daily can cause significant problems. For example, such facilities may restrict the flow of traffic causing traffic backups and lane changing, often increasing the likelihood of accidents and even more bottlenecks. In addition, many people may be delayed from reaching their destinations, and goods may be delayed from getting to market and millions of gallons of fuel may be wasted as vehicles idle. Environments may experience an increase in pollution as idling and slow moving vehicles emit pollutants (particularly carbon dioxide and carbon monoxide), which may pose a significant health hazard to motorists as well as to tollbooth operators.

Some tollbooth systems may have a program requiring that a motorist rent and then attach to the windshield of the vehicle a radio transponder that communicates via radio frequency with receiver units at tollbooth plazas. However, such programs require drivers to seek out the program and to register for the program. These programs may make it mandatory for a motorist to make a credit card deposit and create an automatic debit account arrangement, which may effectively eliminate drivers with credit problems. These programs also may bill participants based on a minimum amount of travel regardless of the actual amount of travel. Thus, many motorists who travel infrequently travel through the toll road may receive little benefit after investing time and money to participate in the program.

SUMMARY

The present disclosure describes systems and techniques that include monitoring a toll facility for vehicles that have been provided by external systems such as law enforcement and notifying an external system that a particular vehicle has been detected traveling through the toll facility. The techniques also may provide automatic, and electronic methods for handling payment from vehicles that use the toll facility. The techniques may verify the correct address of the owner of the vehicle by accessing, for example, one or more motor vehicle registration and postal authority databases. The techniques may employ digital image acquisition and processing methods to process a digital image of a vehicle identifier such as the license plate of an automobile to identify automobile's owner. These techniques can be used alone or in combination with current toll systems requiring radio frequency identification (RFID) devices to be attached to or provided in vehicles in advance.

In one aspect, a method is disclosed that includes capturing an image of a vehicle triggered by a transaction event representing an interaction between the vehicle and a facility, determining a vehicle identifier based on the captured image, checking whether the vehicle identifier matches a vehicle identifier provided by a party, and notifying the party of an occurrence of a match.

The above techniques may include notifying one or more law enforcement authorities or vehicle registration authorities, each being associated with a different jurisdiction. An insurance company also can be notified. A party associated with the vehicle identifier can be notified to request payment based on the transaction event. Notification can occur in substantially real-time or in batch mode. A facility can include at least one of a toll road, a bridge, a tunnel and a parking facility. A vehicle can include a registered vehicle that can include at least one of an automobile, a truck, motorcycle and a bus. A party associated with the vehicle identifier can include a registered owner of the vehicle. The transaction event can include at least one of a distance traveled by the vehicle through the facility, a time period the vehicle is present in a facility, the characteristic of the vehicle interacting with the facility, and the speed at which the vehicle passes through the facility. A payment amount can be based on the transaction event.

The above techniques may include forwarding the transaction event to a party for handling payment, wherein forwarding occurs according to at least one of on a periodic basis or when a number of transaction events meet a predefined threshold. A determination is made of a party associated with the vehicle identifier by searching one or more vehicle registration authority databases each being associated with a particular jurisdiction, using the vehicle identifier as a key for searching the databases. Payment is requested from the party associated with the vehicle identifier based on the transaction event, and a payment response is processed from the party associated with the vehicle identifier. The payment request may occur on a periodic basis or when a number of transaction events meet a predefined threshold. Processing an electronic payment may include processing payment over an electronic communications channel.

The above techniques may also include providing an account for a party associated with the vehicle identifier, receiving over a communications channel a request from the party to review the transaction event, sending to the party the transaction event over the communications channel, and processing payment from the party by deducting from the account an amount based on whether the party agrees with the contents of the transaction event. Processing may include processing an electronic payment over an electronic communications channel.

The above techniques may include accessing a vehicle registration authority for a mailing address of a party associated with the vehicle identifier, accessing a postal authority for a mailing address of the party associated with the vehicle identifier, reconciling the mailing address from the vehicle registration authority with the mailing address from the postal authority. A payment request is sent to the party associated with the vehicle identifier based on the transaction event, wherein the payment request is sent to the reconciled mailing address.

The above techniques may include requesting payment from a party associated with the vehicle identifier, receiving a dispute request from the party associated with the vehicle identifier, sending the party associated with the vehicle identifier the transaction event, and receiving from the party associated with the vehicle identifier payment based on whether the party agrees with the contents of transaction event.

In a second aspect, a system is disclosed that includes a computer to perform the method disclosed above.

In a third aspect, an article is disclosed that includes instructions for performing the method disclosed above.

In a fourth aspect, a method is disclosed that includes capturing an image of a vehicle triggered by a transaction event representing an interaction between the vehicle and a facility, determining a vehicle identifier based on the captured image. A determination is made of a party associated with the vehicle identifier by searching one or more vehicle registration authority databases each being associated with a particular jurisdiction, using the vehicle identifier as a key for searching the databases. Payment is processed from the party associated with the vehicle identifier based on the transaction event, wherein processing payment is performed for each vehicle interacting with the facility.

The above techniques may include forwarding the transaction event to a party for handling payment, wherein forwarding occurs according to at least one of on a periodic basis or when a number of transaction events meet a predefined threshold. Payment may be processed on a periodic basis or when a number of transaction events meet a predefined threshold. Payment may be processed by requesting payment over an electronic communications channel.

The above techniques also may include providing an account for a party associated with the vehicle identifier, receiving over a communications channel a request from the party associated with the vehicle identifier to review the transaction event, sending to the party associated with the vehicle identifier the transaction event over the communications channel, and deducting from the account an amount based on whether the party agrees with the contents of the transaction event.

The above techniques may include accessing a vehicle registration authority for a mailing address of a party associated with the vehicle identifier, accessing a postal authority for a mailing address of the party associated with the vehicle identifier, reconciling the mailing address from the vehicle registration authority with the mailing address from the postal authority, and sending a bill to the party associated with the vehicle identifier based on the transaction event, wherein the payment request is sent to the reconciled mailing address.

In addition, the above techniques also may include receiving a dispute request from the party associated with the vehicle identifier, sending the party associated with the vehicle identifier the transaction event, and receiving from the party associated with the vehicle identifier payment based on whether the party agrees with the contents of transaction event.

According to the above techniques, a party associated with the vehicle identifier may include a registered owner of the vehicle. Payment may be based on amount related to the transaction event. A facility may include at least one of a toll road, a bridge, a tunnel and a parking facility. A vehicle may include a registered vehicle that includes at least one of an automobile, a truck, motorcycle and a bus. A transaction event may include at least one of a distance traveled by the vehicle through the facility, a time period the vehicle is present in a facility, the characteristic of the vehicle interacting with the facility, the speed at which the vehicle passes through the facility, and the vehicle passing through a point of the facility.

In some implementations, the disclosed systems and techniques may provide one or more of the following advantages. Toll revenue authorities can incorporate these techniques into their current systems by leveraging existing infrastructure at toll plazas such as existing digital cameras or other sensors. Using these techniques to automate toll collection may help reduce the current cost of toll processing. For example, these techniques may bill and collect toll fees automatically, reduce personnel costs, and the cost of physically handling money and moving it from toll plazas to other collection facilities or banks. Moreover, these techniques may permit toll authorities to implement variable billing, for example, by calculating toll based on traffic volume or on the time of day. Such demand pricing techniques can help control traffic volume and pollution, while helping to maximize revenue for toll authorities.

The public also may benefit from the disclosed techniques. For example, the techniques may help improve traffic flow, because drivers may be able to proceed through a toll lane and automatically be billed without having to stop to pay the toll. This improvement in traffic flow may help reduce the commute time of drivers and improve the environment as well as people's health by reducing emission of carbon monoxide and other greenhouse gases. In addition, trucks, which currently may be billed based on the number of axles, may be able to use the same tollbooth lanes as automobiles because the number of axles (indicated on the trucks registration information from the motor vehicle authority) can automatically be incorporated into billing calculations. Vehicles may now be able to use all lanes, at all times, without having to stop at a tollbooth. As a result, there may be a decline in the risk of accidents at tollbooths as well as traffic jams and lane changes near the plaza. Such techniques also may reduce the amount of fuel consumed by motor vehicles because stop-and-go traffic patterns may be reduced.

These techniques also may be beneficial to law enforcement and motor vehicle registration authorities. Motor vehicle registration and law enforcement authorities can be alerted if a highlighted vehicle (e.g., an automobile that was reported stolen or an automobile with expired tags or insurance) passes through a particular area such as a toll booth or road. The disclosed system can notify such authorities automatically with digital images and data associated with the highlighted vehicle identifier over wireless communications channels.

In addition, the techniques can fine a speeding motorist automatically, because the distance between two tolls divided by the time interval may approximately yield the speed of the vehicle, or because the system includes sensors, such as lasers, that can determine the speed of the vehicle as it passes. In another example, an individual entering a country on an immigration visa may be able to acquire a driver's license and register a vehicle. Once the visa expires, immigration authorities can highlight license information and forward it to the disclosed system. The system can notify these authorities if a vehicle with the highlighted license plate has traveled through the facility such as a tollbooth. The disclosed system can maintain privacy requirements when it captures and shares information on vehicle movement. For example, it may apply secure computer processing, storage and communications techniques such as encryption, firewalls, password or other techniques.

The disclosed techniques also can be scaleable. For example, the techniques can be easily customized and delivered to multiple states, regions, or countries. In addition, these techniques may form the foundation for commerce conducted in vehicles (e.g., airport parking and garage fees), as well as information-sharing with law enforcement, insurance companies, and payment clearing houses. These techniques also can benefit states without toll booths by giving them insight into the accuracy of the data stored on their registered drivers (e.g., addresses, expiration dates, insurance coverage, etc.). Additionally, the techniques may be able to increase the connectivity between state, local and federal databases.

The techniques also can handle drivers from states that do not participate or drivers who do not want to participate in current toll systems. States may desire to be connected and to share information because of a renewed emphasis on cooperation and reciprocity. In the future, everyone with a license plate may be required to enroll or else avoid toll roads. These techniques also can handle drivers who have used a toll facility and have not remitted payment. In this case, the driver may not be permitted to re-register a vehicle or license and may face a penalty, similar to failing to pay a traffic ticket.

The disclosed techniques can provide a new business model for billing and collecting tolls. For example, a private organization can use the toll management system and techniques to handle toll billing and collection. The organization can then contract with a toll facility authority to forward payment based on at least one of a share of increased revenue (demand pricing), a share of savings (decreased costs), a set fee for each transaction, and a percentage of each transaction.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

Figure 1:
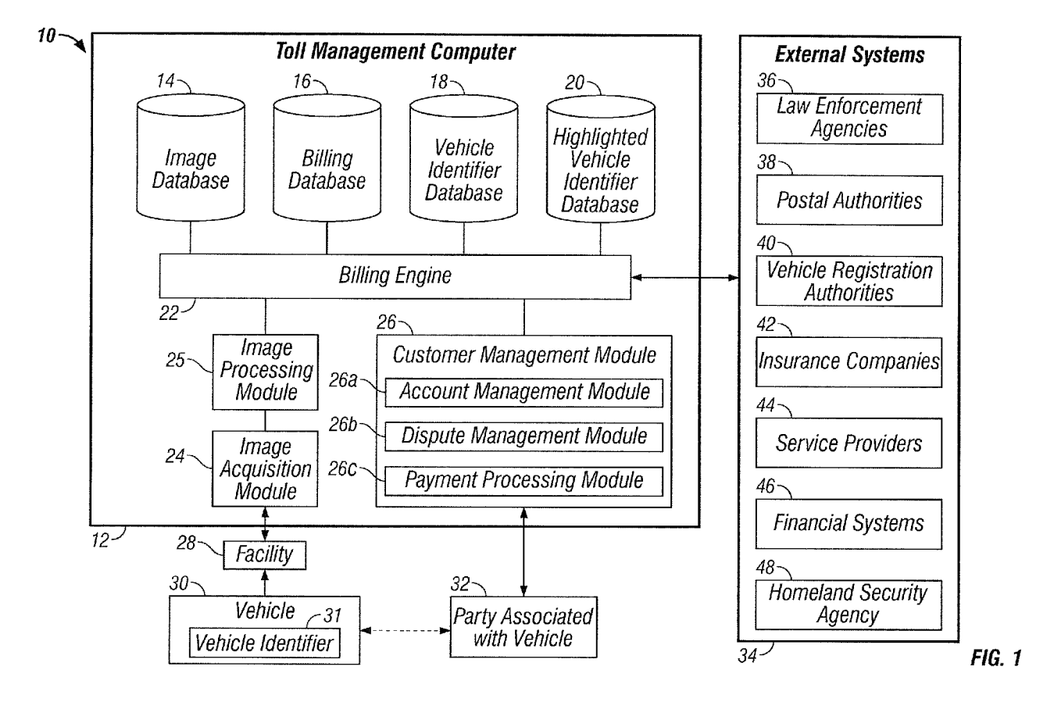
FIG. 1 is a block diagram of an implementation of electronic toll management system.

FIG. 1 is a block diagram of an implementation of an electronic toll management system 10. The system 10 is configured to capture a vehicle identifier 31 of vehicle 30 interacting with a facility 28 and to notify external systems 34 of such interaction. For example, the system 10 may allow a toll road authority to capture a vehicle identifier 31, such as license plate information, from a vehicle 30 traveling through the toll road and then to notify law enforcement whether the captured vehicle identifier matches a license plate previously highlighted by law enforcement.

The toll management system 10 also can manage payment from a party associated with the vehicle 32 based on the interaction between the vehicle 30 and the facility 28. For example, the system 10 can capture license plate information from a vehicle 30 and identify the registered owner of the vehicle. The system would then provide to the owner, over a communications channel such as the Internet, an account for making payment or disputing payment. The toll management system 10 can send a bill requesting payment from the party 32 using a mailing address that has been verified against one or more mailing address sources. The system 10 is capable of automatically capturing an image of the vehicle 30 triggered by the vehicle interacting with the facility. Such image capturing can be accomplished using image-processing technology without having to install a radio transponder (e.g., RFID device) in a vehicle.

The electronic toll management system 10 includes a toll management computer 12 which can be configured in a distributed or a centralized manner. Although one computer 12 is shown, one or more computers can be configured to implement the disclosed techniques. The computer 12 is coupled to a facility 28 that may charge a fee for interacting with the facility. Examples of a facility 28 include a toll facility (managed by toll authorities) such as toll road, a toll bridge, a tunnel, parking facility, or other facility. The fee may be based on the interaction between the vehicle 30 and the facility 28. Examples of interactions that may involve a fee include a distance traveled by the vehicle through the facility, a time period the vehicle is present in a facility, the type of vehicle interacting with the facility, the speed at which the vehicle passes through the facility, and the type of interaction between the vehicle and the facility.

The facility 28 can process vehicles including automobiles, a truck, buses, or other vehicles. For ease of explanation, the system 10 shows a single facility 28 interacting with a single vehicle 30 and a party associated with the vehicle 32. However, in other implementations, the disclosed techniques could be configured to operate with one or more vehicles interacting with one or more facilities spanning different geographic locations.

The toll management computer 12 includes an image acquisition module 24 configured to detect the presence of a vehicle, acquire one or more images of the vehicle, and forward the image(s) to an image-processing module 25 for further processing. The module 24 may include image acquisition equipment based on the physical environment in which it is used. For example, for open-road applications, image acquisition equipment may be mounted above the roadway, on existing structures or on purpose-built gantries. Some open-road applications may use equipment mounted in or beside the roadway as well. Lane-based (or tollbooth-style) applications may use equipment mounted on physical structures beside each lane, instead of or in addition to equipment mounted overhead or in the roadway.

The image acquisition module 24 may include imaging components such as vehicle sensors, cameras, digitizing systems, or other components. Vehicle sensors can detect the presence of a vehicle and provide a signal that triggers a camera to capture one or more images of the vehicle. Vehicle sensors may include one or more of the following:

(1) Laser/sonic/microwave devices—these devices, commonly used in Intelligent Transportation Systems (ITS) applications, can recognize the presence of a vehicle and provide information regarding the vehicle's size, classification, and/or speed. These sensors may be configured to provide additional information about the vehicle which can be used in identify the vehicle and its use of the toll facility, including trip time and compliance with traffic laws.

(2) Loops—these sensors can detect the presence and the vehicle type by recognizing the presence of metal masses using a wire loop embedded in the road. Loops can be used as a backup to more sophisticated sensors.

(3) Through-beam sensors—these sensors may emit a continuous beam across the roadway, and detect the presence of a vehicle based upon interruptions in the beam. This type of sensor may be used in installations where traffic is channeled into tollbooth-style lanes.

(4) Optical sensors—vehicle may be recognized using cameras to continuously monitor images of the roadway for changes indicating the presence of a vehicle. These cameras also can be used to record images for vehicle identification.

Cameras can be used to capture images of vehicles and their identifying characteristics. For example, they can be used to generate a vehicle identifier such as a vehicle license number based on an image of a license plate. Cameras may be analog or digital, and may capture one or more images of each vehicle.

Digitizing systems convert images into digital form. If analog cameras are used, the cameras can be connected to separate digitizing hardware. This hardware may include a dedicated processing device for analog-to-digital conversion or may be based on an input device installed in a general-purpose computer, which may perform additional functions such as image processing. Lighting can be employed to provide adequate and consistent conditions for image acquisition. The lighting may include strobes or continuous illumination, and may emit light of light in the visible spectrum or in the infrared spectrum. If strobes are used, they may be triggered by inputs from the vehicle sensor(s). Other sensors such as light sensors may be required to control the image acquisition module 24 and provide consistent results.

Once the image acquisition module 24 has captured images of the vehicles, the images may be forwarded to an image-processing module 25. The image-processing module 25 may be located in the same location as the image acquisition module 24 and the image computer 12, in a remote location, or a combination of these locations. The module 25 can process a single image for each vehicle or multiple images of each vehicle, depending on the functionality of the image acquisition module 24 and/or business requirements (e.g. accuracy, jurisdictional requirements). If multiple images are used, each image may be processed, and the results may be compared or combined to enhance the accuracy of the process. For example, more than one image of a rear license plate, or images of both front and rear license plates, may be processed and the results compared to determine the most likely registration number and/or confidence level. Image processing may include identifying the distinguishing features of a vehicle (e.g., the license plate of a vehicle) within the image, and analyzing those features. Analysis may include optical character recognition (OCR), template matching, or other analysis techniques.

The toll management system 10 may include other systems capable of substantially real-time processing located at the site where images are acquired to reduce data communication requirements. In an implementation of local image processing, the results may be compared to a list of authorized vehicles. If a vehicle is recognized as authorized, images and/or data may be discarded rather than forwarded for further processing.

Images and data can be forwarded to a central processing facility such as the image database 14 operating in conjunction with the billing engine 22. This process may involve a computer network, but may also include physical media from another computer located at the image acquisition site (i.e., facility 28). Generally, information can be temporarily stored on a computer at the image acquisition site in the event the network is unavailable.

Images received at the central site may not have been processed. Any unprocessed images can be handled as described above. The data resulting from image processing (remote or central) may be separated into two categories. Data that meets application-specific or jurisdiction-specific criteria for confidence may be sent directly to the billing engine 22. On the other hand, data results not meeting required confidence levels may be flagged for additional processing. Additional processing may include, for example, determining whether multiple images of a vehicle are available and independently processing the images and comparing the results. This may include character-by-character comparisons of the results of optical character recognition (OCR) on the license plate image. In another example, the image(s) may be processed by one or more specialized algorithms for recognizing license plates of certain types or styles (such as plates from a particular jurisdiction). These algorithms may consider the validity of characters for each position on the license plate, the anticipated effect of certain design features (such as background images), or other style-specific criteria. The processed image may be forwarded based on preliminary processing results, or may include processing by all available algorithms to determine the highest confidence level.

Preliminary data may be compared to other data available to increase the confidence level. Such techniques include:

(1) Comparing OCR processed license plate data against lists of valid license plate numbers within the billing system or at the appropriate jurisdiction's motor vehicle registration authority.

(2) Comparing other data obtained from sensors at the imaging location (such as vehicle size) to known characteristics of the vehicle registered under the registration number recognized by the system, in the recognized jurisdiction or in multiple jurisdictions.

(3) Comparing the registration and other data to records from other sites (e.g., records of the same or similar vehicle using other facilities on the same day, or using the same facility at other times).

(4) Manually viewing the images or data to confirm or override the results of automated processing.

If additional processing provides a result with a particular confidence level, the resulting data then can be forwarded to the billing engine 22. If the required confidence level cannot be attained, the data may be kept for future reference or discarded.

The billing engine 22 processes the information captured during the interaction between the vehicle and the toll facility, including the vehicle identifier as determined by the image processing module 25 to create a transaction event corresponding to an interaction between the vehicle and the facility. The engine 22 can store the transaction event in a billing database 16 for subsequent payment processing. For example, the billing engine 22, alone or in combination with a customer management module 26 (described below), produces payment requests based on the transaction events. The transaction event data may include individual charges based on a vehicle's presence at specific points or facilities, or trip charges based on a vehicle's origin and destination involving a facility. These transaction events can be compiled and billed, for example, by one or more of the following methods:

(1) Deducting payment from an account established by the vehicle owner or operator. For example, the billing database 20 can be used to store an account record for each vehicle owner. In turn, each account record can include a reference to one more transaction events. A paper or electronic payment statement may be issued and sent to the registered owner of the vehicle.

(2) Generating a paper bill and sending it to the owner of the vehicle using a mailing address derived from a vehicle registration record.

(3) Presenting an electronic bill to a predefined account for the vehicle owner, hosted either by the computer 12 or a third party.

(4) Submitting a bill to the appropriate vehicle registration authority or tax authority, permitting payment to be collected during the vehicle registration renewal process or during the tax collection process.

Billing may occur at regular intervals, or when transactions meet a certain threshold, such as maximum interval of time or maximum dollar amount of outstanding toll charges and other fees. Owners may be able to aggregate billing for multiple vehicles by establishing an account with the computer 12.

The customer management module 26 can allow a user to interact with the toll management computer 12 over a communications channel such as a computer network (e.g., Internet, wired, wireless, etc.), a telephone connection, or other channel. The user can include a party associated with a vehicle 22 (e.g., owner of the vehicle), a public or private authority responsible for management of the facility 28, or other user. The customer management module 26 includes a combination of hardware and software module configured to handle customer interactions such as an account management module 26a, a dispute management module 26b and a payment processing module 26c. The module 26 employs secure access techniques such as encryption, firewalls, password or other techniques.

The account management module 26a allows users such as motorists to create an account with the system 10, associate multiple vehicles with that account, view transactions for the account, view images associated with those transactions, and make payments on the account. In one implementation, a user responsible for the facility can access billing and collection information associated with motorists that have used the facility.

The dispute management module 26b may permit customers to dispute specific transactions on their accounts and to resolve disputes using the computer 12 or third parties. Disputes may arise during billing situations. The module 26b may help resolve such disputes in an automated fashion. The module 26b can provide a customer to access an "eResolution" section of a controlling/billing authority website. Customers can file a dispute and download an image of their transaction, the one in question. If there is no match (i.e., the customers automobile is not the automobile in the photo frame), the bill can be forwarded for a third party evaluation such as arbitration. In the far more likely case, the photo will show that the customer's automobile was indeed billed correctly. Dispute management can use encrypted security in which all text and images are sent over a computer network (e.g., the Internet) using high strength encryption. Proof of presence images can be embedded into the dispute resolution communication as an electronic watermark.

The payment processing module 26c provides functionality for processing payments manually or electronically, depending on the remittance received. For example, if payment remittance is in the form of a paper check, then scanning devices could be used to convert the paper information into electronic format for further processing. On the other hand if electronic payment is employed, then standard electronic payment techniques can be used. The payment processing module 26c can support billing methods such as traditional mailing, electronic payment (e.g. using a credit card, debit card, smart card, or Automated Clearing House transaction), periodic billing (e.g., send the bill monthly, quarterly, upon reaching a threshold, or other). The payment processing module 26c can support discounts and surcharges based on frequency of usage, method of payment, or time of facility usage. The payment processing module 26c also can support payment collection methods such as traditional check processing, processing payment during renewal of a vehicle registration (with interest accrued), electronic payment, direct debit bank, credit cards, pre-payment, customer-initiated payments (as often as the customer desires), or provide discounts for different purposes.

The toll management computer 12 communicates with external systems 34 using one or more communications techniques compatible with the communications interfaces of the systems. For example, communications interfaces can include computer networks such as the Internet, electronic data interchange (EDI), batch data file transfers, messaging systems, or other interfaces. In one implementation, external systems 34 include law enforcement agencies 36, postal authorities 38, vehicle registration authorities 40, insurance companies 42, service providers 44, financial systems 46 and a homeland security agency 48. The external systems 34 can involve private or public organizations that span one or more geographic locations such as states, regions, countries, or other geographic locations.

The toll management computer 12 can interface and exchange information with law enforcement agencies 36. For example, as vehicles are identified, the computer can submit substantially real-time transactions to law enforcement systems, in formats defined by the law enforcement agencies. Transactions also can be submitted for vehicles carrying hazardous materials or violating traffic regulations (e.g. speeding, weight violations, missing plates), if the appropriate sensors are in place (e.g. laser/sonic/microwave detectors as described above, weight sensors, radiation detectors). Alternatively, vehicle records can be compiled and forwarded in batches, based on lists provided by law enforcement agencies.

The highlighted vehicle identifier database 20 can be used to store the lists provided by the law enforcement agencies. The term "highlighted" refers to the notion that the law enforcement agencies have provided a list of vehicle identifiers that the agencies have indicated (highlighted) they wish the toll facility to monitor. For example, when a motor vehicle is stolen and reported to police, the police can send a list of highlighted vehicle identifiers to the database 20. When the vehicle highlighted by the police travels through facility, the imaging processing module 24 determines a vehicle identifier associated with the vehicle and determines through certain interfaces that the particular vehicle is being sought by law enforcement. The law enforcement authorities may wish to be instantly notified of the location of the vehicle (and driver), the time it was detected at the location, and the direction it was headed. The computer 12 can notify in substantially real-time mobile units associated with law enforcement. In addition, law enforcement can automatically highlight vehicles based upon the expiration of a license, occurrence of a traffic court date, or other event. This could, in turn, help keep illegal drivers off the road and increase revenue to the state.

The toll management computer 12 can interface and exchange information with postal authorities 38. Since the disclosed techniques would require toll authorities to convert from receiving payment by drivers at the time of travel to receiving paying in arrears, it is important that bills be sent to the correct driver/vehicle owner. To minimize the possibility of sending the bill to the wrong person, the computer 12 supports address reconciliation. For example, before a bill is mailed, the computer 12 verifies that the address provided by a motor vehicle department matches the address provided by the postal authority. The motor vehicle database can then be updated with the most accurate address information related to the vehicle owner. Since this occurs before the bill is mailed, billing errors can be reduced.

The toll management computer 12 can interface and exchange information with vehicle registration authorities 40. The registration authorities 40 provide an interface to exchange information related to the owners of vehicles, the owners' addresses, characteristics of the vehicles, or other information. Alternatively, this information can be accessed through third-party data providers rather than through an interface to public motor vehicle records. The accuracy of records in the various databases used by the computer 12, including vehicle ownership and owner addresses, may be verified periodically against third-party databases or government records, including motor vehicle records and address records. This may help ensure the quality of ownership and address records, and reduce billing errors and returned correspondence.

The toll management computer 12 can interface and exchange information with insurance companies 42. Insurance companies could highlight vehicle identifiers in a manner similar to law enforcement authorities 36. For example, the highlighted vehicle identifiers database 20 can include license plate numbers of vehicles with an expired insurance indicating that such drives would be driving illegally. The computer could notify law enforcement as well as insurance companies whether the highlighted vehicle has been detected using a particular facility.

The toll management computer 12 can interface and exchange service providers 44. For example, the computer 12 can support batch or real-time interfaces for forwarding billing and payment collection functions to billing service providers or collection agencies.

The toll management computer 12 can interface and exchange information with financial systems 46. For example, to handle bill payment and collection, the computer 12 can interface to credit card processors, banks, and third-party electronic bill presentment systems. The computer 12 can also exchange information with accounting systems.

The toll management computer 12 can interface and exchange information with the homeland security agency 48. The office of homeland security can automatically provide a list of individuals for use in the highlighted vehicle identifier database 20. For example, registered drivers that are on a visa to this country can be automatically highlighted when that visa expires. The computer 12 would then notify the office of homeland security 48 that the highlighted vehicle identifier associated with the person has been detected driving in the country including the time and location information about the vehicle.

As described above, data captured from the toll site flows into the image database, and is retrieved from the image database by the billing engine. In another implementation, the toll computer detects, for each vehicle, an interaction between the vehicle and a toll facility, captures images and generates a data record. The data record can include date, time, and location of transaction, a reference to the image file, and any other data available from the sensors at the facility (e.g., speed, size). The image can be passed to the image-processing module 25, which can generate a vehicle identifier, a state, and a confidence factor for each vehicle.

This information can be added to the data record. (This process my occur after transmission to the central facility.) The data record and image file can be sent to the central facility. The image can be stored in the image database, and referenced if (a) additional processing is required to identify the vehicle, or (b) someone wishes to verify the transaction. If the confidence level is adequate, the data record can be submitted to the billing engine, which can associate it with an account and store it in the billing database for later billing. If no account exists, the vehicle identifier is submitted to the appropriate state registration authority or a third-party service provider to determine the owner and establish an account. This process may be delayed until enough transactions are collected for the vehicle to justify issuing a bill. If confidence level is not adequate, additional processing may be performed as described elsewhere.

The techniques described above describe the flow of data based on a single transaction end-to-end, then looping back to the beginning. In another implementation, some of the functions described may be event-driven or scheduled, and may operate independently of one another. For example, there may be no flow of control from back-end processes to vehicle imaging. The imaging process may be initiated by an event, including the presence of a vehicle at the toll site.

In another implementation, the system may be used to monitor traffic and manage incidents. For example, if a drop in average vehicle speed is detected, the computer can send a message to a highway control facility alerting controllers to the possibility of an incident. Authorized controllers may communicate with the equipment at the toll site to view images from the cameras and determine if a response is required.

The operation of the toll management system 10 is explained with reference to FIGS. 2-5.

Figure 2:
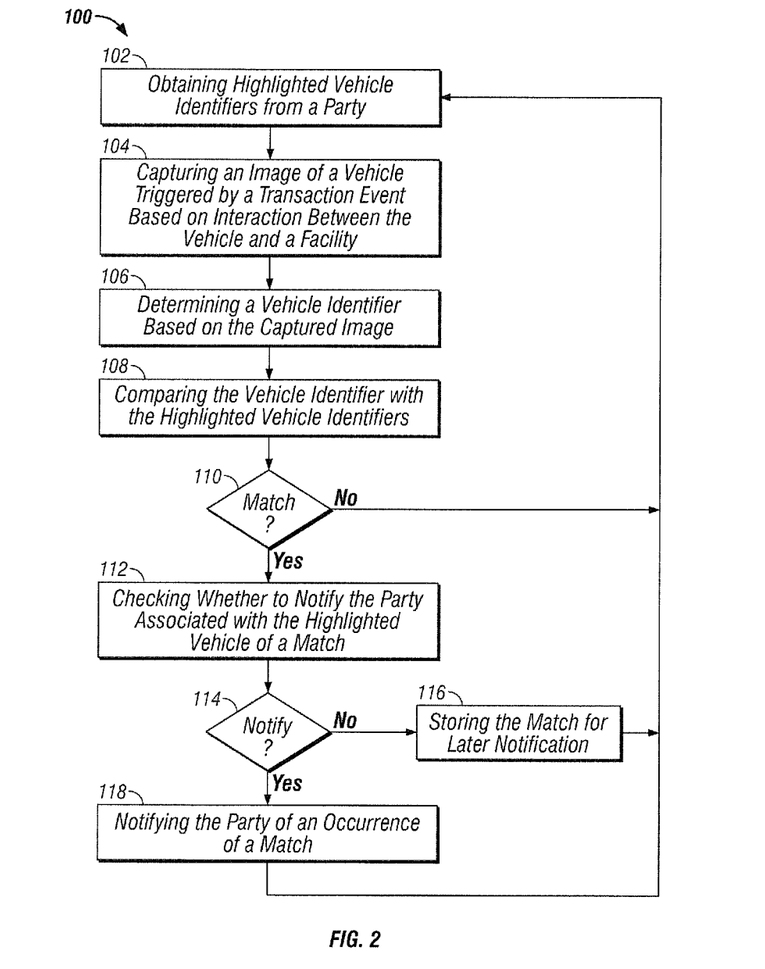
FIG. 2 is a flow chart of an implementation of electronic toll management system related to highlighted vehicle identifier management.

FIG. 2 is a flow chart of an implementation of electronic toll management system related, particularly a process 100 for managing highlighted vehicle identifiers 20 provided by external systems 34. To illustrate, in one example, it is assumed that law enforcement agencies 36 generate a list of highlighted vehicle identifiers (e.g., license plate numbers) of drivers being sought by the agencies and that the agencies 36 wish to be notified when such vehicles have been identified using a toll facility 28.

The computer 12 obtains (block 102) highlighted vehicle identifiers from a party such as law enforcement agencies 36. In one implementation, these vehicle identifiers can be stored in the vehicle identifier database 20 for subsequent processing. The database 20 can be updated by the agencies with new as well as additional information in real-time and/or in batch mode. The law enforcement agencies accessed by the computer span across multiple jurisdictions such as cities, municipalities, states, regions, countries or other geographic designations. As a result, the computer 12 can process vehicle information across multiple jurisdictions and on a national scale.

The computer 12 captures (block 104) an image of a vehicle triggered by a transaction event based on an interaction between the vehicle 30 and the facility 28. For example, the image acquisition module 24 can be used to acquire one or more images of a vehicle as it travels through a facility such as a toll road. These images can be stored in the image database 14 for further processing by the image-processing module 25. Compression techniques can be applied to the captured images to help reduce the size of the database 14.

The computer 12 determines (block 106) a vehicle identifier based on the captured image. For example, as discussed previously, the image-processing module 25 can apply image analysis techniques to the raw images in the image database 14. These analysis techniques can extract a license number from one or more images of a license plate of the vehicle. The extracted vehicle identifiers can be stored in the vehicle identifier database 18 for further processing.

The computer 12 compares (block 108) a captured vehicle identifier with the highlighted vehicle identifier. For example, the computer 12 can compare a captured license plate number from the vehicle identifier database 18 with a license number from the highlighted vehicle identifier database 20. As discussed above, automatic as well as manual techniques can be applied to check for a match.

If the computer 12 detects a match (block 110) between the license numbers, then it checks (block 112) how the party associated with the highlighted vehicle identifiers wishes to be notified. This information can be stored in the vehicle identifier database 20 or other storage mechanism. On the other hand, if there is no match, the computer 12 resumes executing the process 100 beginning at block 102.

If the party indicates that it wishes to be notified immediately (block 114), then the computer notifies (block 118) the party upon the occurrence of a match. In this example, the computer can notify law enforcement of the match in substantially real-time using wireless communications techniques or over a computer network.

On the other hand, if the party does not wish to be notified immediately (block 114), then the computer 12 stores (block 116) the match for later notification upon satisfaction of predefined criteria. In one implementation, predefined criteria can include gathering a predefined number of matches and then sending the matches to law enforcement in batch mode.

Once the party has been notified (block 118) of a match or the match has been stored for later notification (block 116), the computer 12 resumes executing process 100 beginning at block 102.

Figure 3:
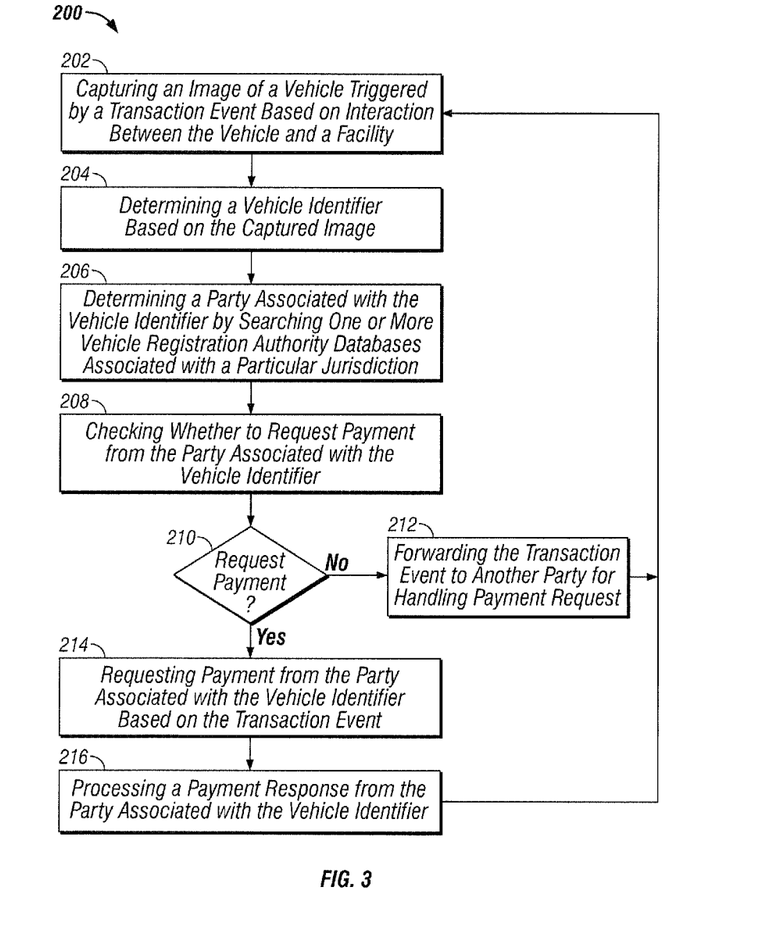
FIG. 3 is a flow chart of an implementation of electronic toll management system related to payment management.

FIG. 3 is a flow chart of an implementation of electronic toll management system 10, particularly a process 200 for managing payment from a party associated with a vehicle that has interacted with a facility. To illustrate, in one example, it is assumed that a toll road authority decides to employ the disclosed techniques to handle payment processing including billing and collecting tolls from vehicles using its toll road.

The computer 12 captures (block 202) an image of a vehicle triggered by a transaction event based on an interaction between the vehicle and a facility. This function is similar to the process discussed above in reference to block 104 of FIG. 2. For example, the image acquisition module 24 can be used to acquire one or more images of a vehicle 30 as it travels through the toll road 28. These images can be stored in the image database 14 for further processing by the image-processing module 25.

The computer 12 determines (block 204) a vehicle identifier based on the captured image. This function is also similar to the process discussed above in reference to block 106 of FIG. 2. For example, the image-processing module 25 can be used to extract a license number from one or more images of a license plate of the vehicle. These vehicle identifiers can be stored in the vehicle identifier database 18 for further processing.

The computer 12 determines (block 206) a party associated with the vehicle identifier by searching a registration authority databases. For example, the computer 12 can use the vehicle identifier from the vehicle identifier database 18 to search a database of a vehicle registration authority 40 to determine the registered owner of the vehicle associated with the vehicle identifier. The computer 12 is capable of accessing vehicle information from one or more vehicle registration databases across multiple jurisdictions such as cities, municipalities, states, regions, countries or other geographic locations. In one implementation, the computer 12 can maintain a copy of registration information from multiple registration authorities for subsequent processing. Alternatively, the computer 12 can access multiple registration authorities and obtain registration information on a demand basis. In either case, these techniques allow the computer 12 to process vehicle information across multiple jurisdictions, and thus process vehicles on a national scale.

The computer 12 checks (block 208) whether to request payment from the party associated with the vehicle identifier. The request for payment can depend on payment processing information associated with the registered owner. For example, the registered owner may be sent a bill based on a periodic basis (e.g., monthly basis), when a predefined amount has been reached, or other arrangement.

If the computer 12 determines that payment is required (block 210), then it requests (block 214) payment from the party associated with the vehicle identifier based on the transaction event. As discussed above, a request for payment can be generated using traditional mail service techniques or electronic techniques such as electronic payment. The amount of the bill can depend on information from the transaction event such as the nature of the interaction between the vehicle and the facility. For example, the transaction event can indicate that the vehicle traveled a particular distance defined as a distance between a starting and ending point on the toll road. Accordingly, the amount of the payment requested from the registered owner can be based on the distance traveled.

On the other hand, if the computer 12 determines that payment is not required (block 210), then it forwards (block 212) the transaction event to another party to handle the payment request. For example, the toll authority may have decided that the computer 12 can handle image processing functions and that toll billing and collection should be handled by a third party such as external systems 34. In one implementation, the computer 12 can interface with service providers 44 and financial systems 48 to handle all or part of the billing and payment-processing functionality. Once the transaction event has been forwarded to a third party, the computer 12 resumes executing the functions of process 200 beginning at block 202.

If the computer handles payment processing, the computer 12 processes (block 216) a payment response from the party associated with the vehicle identifier. In one implementation, the billing database 16, in conjunction with the billing engine 22 and the customer management module 26, can be used to handle billing and collection functions. As discussed above, the payment processing module 26c can support electronic or manual payment processing depending on the remittance received. For example, the computer 12 can provide an account for handling electronic payment processing over a computer network such as the Internet. The computer can also handle traditional payment receipt such as a check.

Once a payment has been processed (block 216), the computer 12 resumes executing process 200 beginning at block 202.

Figure 4:
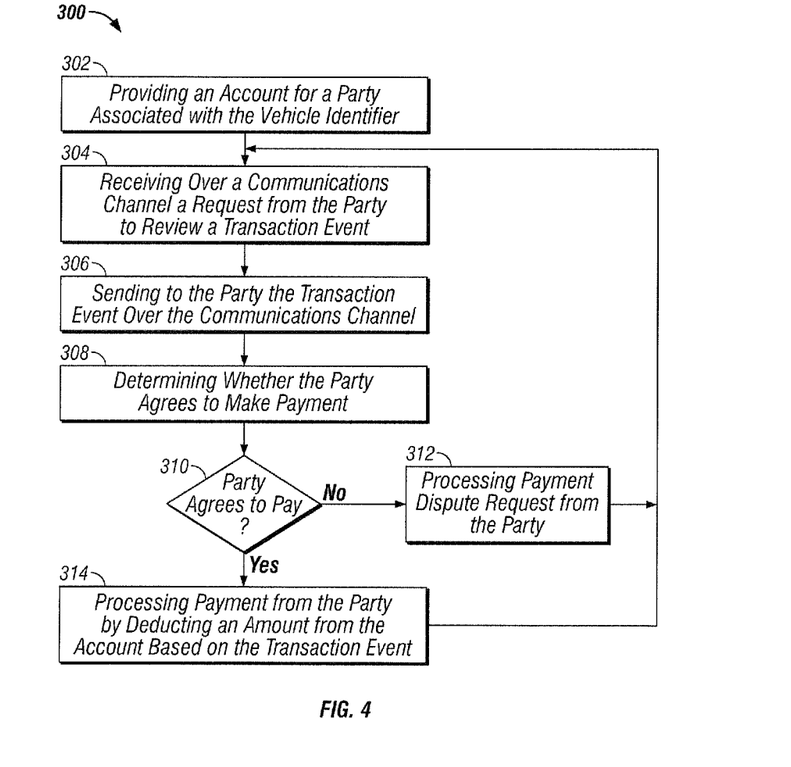
FIG. 4 is a flow chart of an implementation of electronic toll management system related to payment management.

FIG. 4 is a flow chart of an implementation of electronic toll management system 10, particularly process 300 for managing payment over a communications channel from a party associated with a vehicle that has interacted with a facility. To illustrate, assume a toll authority responsible for a toll road employs the disclosed techniques and that a registered owner wishes to efficiently and automatically make payments for using the toll road.

The computer 12 provides (block 302) an account for a party associated with the vehicle identifier. In one embodiment, the computer 12 in conjunction with the account management module 26a can provide a website for customers to open an account for making electronic payment over a computer network such as the Internet. The website also can permit the customer to access and update account information such as payment history, payment amount due, preferred payment method, or other information.

The computer 12 receives (block 304) a request over a communications channel from the party to review a transaction event. For example, the account payment module 26a can handle this request by retrieving transaction event information associated with the customer's account from the billing database 16. The retrieved information can include image data of a particular transaction involving the customer's vehicle and the tollbooth.

The computer 12 sends (block 306) the transaction event to the party 32 over the communications channel. Information related to the transaction event can include images of the vehicle and the vehicle identifier (i.e., license plate). Such data can be encrypted to permit secure transmission over the Internet. Standard communications protocols such as hypertext markup language (HTML) can be used to transmit the information over the Internet.

The computer 12 determines (block 308) whether the party agrees to make payment. For example, once the customer receives the information related to the transaction event, the customer can review the information to determine whether to make payment based on whether the vehicle shown in the images is the customer's vehicle.

If the computer 12 determines (block 310) that the party agrees to pay, then it processes (block 314) payment from the party by deducting an amount from the account based on the transaction event. For example, if the image information indicates that the transaction event data is accurate, then the customer can authorize payment such as by submitting an electronic payment transaction.

On the other hand, if the computer 12 determines (block 310) that the party does not agrees to pay, then the computer 12 processes (block 312) a payment dispute request from the party. In one implementation, the dispute management module 26b can handle a dispute request submitted by the customer using online techniques. The module 26b can handle specific transactions related to the customer's account including involving a third party to resolve the dispute.

Once a payment has been processed (block 314) or a dispute resolved (block 312), the computer 12 resumes executing process 300 beginning at block 304.

Figure 5:
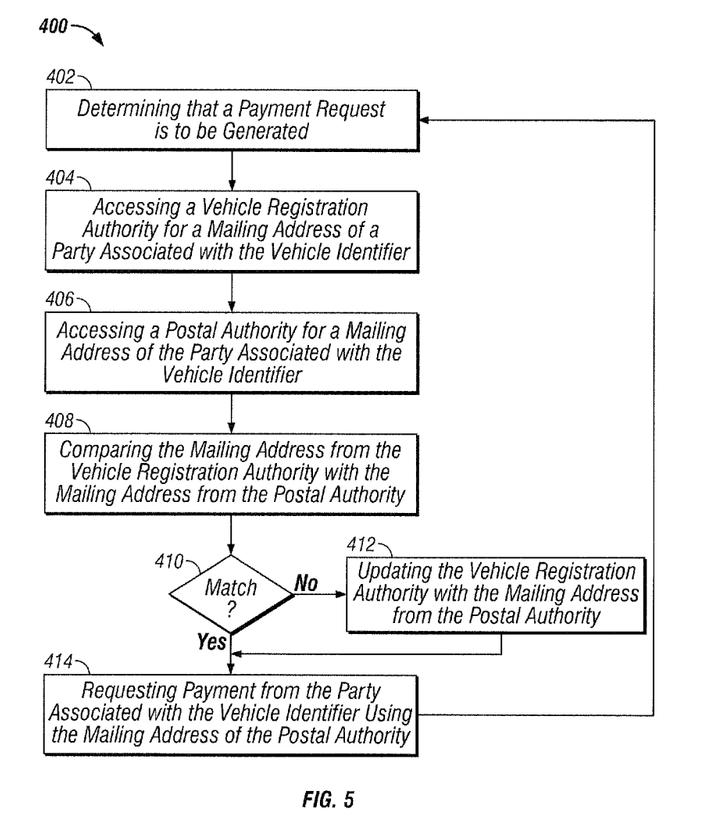
FIG. 5 is a flow chart of an implementation of electronic toll management system related to mailing address verification.

FIG. 5 is a flow chart of an implementation of electronic toll management system, particularly a process 400 for reconciling mailing addresses from different sources. To illustrate, it is assumed that a toll authority has decided to employ the disclosed techniques for processing payment related to the use of toll facility. Since the disclosed techniques involve processing payment some time after the vehicle has traveled through the toll authority, these techniques help ensure that payment is sent to the correct address of the registered owner of the vehicle.

The computer 12 determines (block 402) that a payment request is to be sent to a party associated with a vehicle identifier. As explained above, for example, payment requests may be generated based on a periodic basis or on an amount threshold basis.

The computer 12 accesses (block 404) a vehicle registration authority for a mailing address of a party associated with the vehicle identifier. For example, the computer 12 may access one or more databases associated with vehicle registration authorities 40 to retrieve information such as the mailing address of the registered owner of the vehicle.

The computer 12 accesses (block 406) a postal authority for a mailing address of the party associated with the vehicle identifier. For example, the computer 12 may access one or more databases associated with postal authorities 38 to retrieve information such as the mailing address of the registered owner of the vehicle.

The computer 12 compares (block 408) the mailing address from the vehicle registration authority with the mailing address from the postal authority. For example, the computer compares the mailing addresses from the two authorities to determine if there is a discrepancy between the database information.

If the computer 12 determines (block 410) that the addresses match, then it requests (block 414) payment from the party associated with the vehicle identifier using the mailing address accessed from the postal authority. For example, the computer 12 can use the techniques discussed above to handle payment processing including billing and collecting payment from the registered owner.

On the other hand, if the computer 12 determines (block 410) that the addresses do not match, it then updates (block 412) the vehicle registration authority with the mailing address from the postal authority. For example, the computer 12 can update databases associated with vehicle registration authorities 40 with the correct mailing address retrieved from the postal authorities 38. Such techniques may help reduce the likelihood of mailing a bill to an incorrect mailing address resulting in an reducing time for payment remittance.

Once the vehicle registration authority has been updated (block 412) or payment requested (block 414), the computer 12 executes process 400 beginning at block 402 as explained above.

The above applications represent illustrative examples and the disclosed techniques disclosed can be employed in other applications.

The systems and techniques described here can be implemented in digital electronic circuitry, or in computer hardware, firmware, software, or in combinations of them. The systems and techniques described here can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the systems and techniques described here can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other implementations are within the scope of the following claims.

What is claimed is:

1. A computerized method comprising:
providing a website configured to enable users to open an account with a toll management system for payment of toll fees;
electronically receiving, from a user associated with a vehicle and through the user interacting with the website, a request to open a toll payment account and a selection of a preferred toll fee payment method;
generating an account record for the user that includes the selected preferred toll fee payment method and storing the account record in a billing database;
electronically detecting, through use of a vehicle sensor, a transaction event representing an interaction between the vehicle and a toll facility, the transaction event corresponding to the vehicle traveling a particular distance defined as a distance between a starting point and an ending point on a toll road;
in response to detecting the transaction event, using a camera to capture an image of the vehicle;
electronically determining a license plate number and a state for the vehicle based on the captured image of the vehicle;
electronically selecting, based on the determined state, a state vehicle registration system from among multiple different candidate state vehicle registration systems, each candidate state vehicle registration system being a computer system of a public motor vehicle department affiliated with a state;
electronically accessing the selected state vehicle registration system;
electronically searching public motor vehicle records stored by the selected state vehicle registration system using the license plate number as a key for searching the public motor vehicle records;
electronically identifying a public motor vehicle record as corresponding to the vehicle based on the searching of public motor vehicle records stored by the selected state vehicle registration system;
using the identified public motor vehicle record to electronically search the billing database to identify the account record of the user associated with the vehicle;
accessing, from the account record, the preferred toll fee payment method selected by the user;
calculating a toll fee for the transaction event based on the particular distance traveled by the vehicle on the toll road; and
requesting payment of the toll fee corresponding to the transaction event from the user in accordance with the accessed preferred toll fee payment method selected by the user.

2. The method of claim 1, wherein requesting payment from the party comprises:
electronically retrieving a mailing address for the vehicle from the public motor vehicle record identified as corresponding to the vehicle, and
sending, to the mailing address, a request for the payment.

3. The method of claim 1, wherein electronically detecting the transaction event comprises using the vehicle sensor to electronically detect a presence of the vehicle at a toll site of the toll facility and to electronically detect at least one of a characteristic of the vehicle interacting with the toll site.

4. The method of claim 1, wherein electronically selecting from among multiple different candidate state vehicle registration systems comprises electronically selecting from among three or more different candidate state vehicle registration systems based on the determined state.

5. A system comprising:
a billing database for storing user account records;
a toll facility that includes a vehicle sensor and a camera, the toll facility being configured to:
electronically detect, through use of the vehicle sensor, a transaction event representing an interaction between a vehicle and the toll facility, the transaction event corresponding to the vehicle traveling a particular distance defined as a distance between a starting point and an ending point on a toll road, and
in response to detecting the transaction event, using the camera to electronically capture an image of the vehicle; and
a computer system configured to:
provide a website configured to enable users to open an account with a toll management system for payment of toll fees;
electronically receive, from a user associated with the vehicle and through the user interacting with the website, a request to open a toll payment account and a selection of a referred toll fee payment method;
generate an account record for the user that includes the selected preferred toll fee payment method;
store the account record in the billing database;
access the captured image of the vehicle;

electronically determine a license plate number and a state for the vehicle based on the captured image of the vehicle, electronically select, based on the determined state, a state vehicle registration system from among multiple different candidate state vehicle registration systems, each candidate state vehicle registration system being a computer system of a public motor vehicle department affiliated with a state, electronically access the selected state vehicle registration system, electronically search public motor vehicle records stored by the selected state vehicle registration system using the license plate number as a key for searching the public motor vehicle records, electronically identify a public motor vehicle record as corresponding to the vehicle based on the searching of public motor vehicle records stored by the selected state vehicle registration system, use the identified public motor vehicle record to electronically search the billing database to identify the account record of the user associated with the vehicle, access, from the account record, the preferred toll payment method selected by the user, calculate a toll fee for the transaction event based on the particular distance traveled by the vehicle; and request payment of the toll fee corresponding to the transaction event from the user in accordance with the accessed preferred toll fee payment method selected by the user.

6. The system of claim 5, wherein the toll facility configured to electronically detect the transaction event comprises the toll facility being configured to electronically detect a presence of the vehicle at a toll site of the toll facility and electronically detect, using the vehicle sensor, at least one of a characteristic of the vehicle interacting with the toll site.

7. The system of claim 5, wherein the computer system being configured to electronically select from among multiple different candidate state vehicle registration systems comprises the computer system being configured to electronically select from among three or more different candidate state vehicle registration systems based on the determined state.

8. The method of claim 1, further comprising:
electronically receiving, from a second user associated with a second and different vehicle and through the second user interacting with the website, a request to open a toll payment account and a selection of a preferred toll fee payment method for the second user;
generating an account record for the second user that includes the selected preferred toll fee payment method for the second user and storing the account record for the second user in the billing database;
electronically detecting, through use of the vehicle sensor, a second transaction event representing an interaction between the second and different vehicle and the toll facility, the second transaction event corresponding to the second vehicle traveling a second particular distance defined as a distance between a second starting point and a second ending point on the toll road;
in response to detecting the second transaction event, using the camera to capture an image of the second vehicle;
electronically determining a second and different license plate number and a second and different state for the second vehicle based on the captured image of the second vehicle;

electronically selecting, based on the determined second state, a second state vehicle registration system from among the multiple different candidate state vehicle registration systems, the selected second state vehicle registration system and the selected state vehicle registration system being different systems for different states;
electronically accessing the selected second state vehicle registration system;
electronically searching public motor vehicle records stored by the selected second state vehicle registration system using the second license plate number as a key for searching the public motor vehicle records;
electronically identifying a second public motor vehicle record as corresponding to the second vehicle based on the searching of public motor vehicle records stored by the selected second state vehicle registration system;
using the identified second public motor vehicle record to electronically search the billing database to identify the account record for the second user associated with the second vehicle;
accessing, from the account record for the second user, the preferred toll payment method selected by the second user,
calculating a toll fee for the second transaction event based on the second particular distance traveled by the second vehicle; and
requesting payment of the toll fee corresponding to the second transaction event from the second user in accordance with the accessed preferred toll fee payment method selected by the second user.

9. The method of claim 5, wherein:
the toll facility is further configured to:
electronically detect, through use of the vehicle sensor, a second transaction event representing an interaction between a second and different vehicle and the toll facility, the second transaction event corresponding to the second vehicle traveling a second particular distance defined as a distance between a second starting point and a second ending point on the toll road, and
in response to detecting the second transaction event, using the camera to electronically capture an image of the second vehicle; and
the computer system is further configured to:
electronically receive, from a second user associated with the second vehicle and through the second user interacting with the website, a request to open a toll payment account and a selection of a preferred toll fee payment method for the second user;
generate an account record for the second user that includes the selected preferred toll fee payment method for the second user and storing the account record for the second user in the billing database;
electronically determine a second and different license plate number and a second and different state for the second vehicle based on the captured image of the second vehicle;
electronically select, based on the determined second state, a second state vehicle registration system from among the multiple different candidate state vehicle registration systems, the selected second state vehicle registration system and the selected state vehicle registration system being different systems for different states;
electronically access the selected second state vehicle registration system;
electronically search public motor vehicle records stored by the selected second state vehicle registration system using the second license plate number as a key for searching the public motor vehicle records;

electronically identify a second public motor vehicle record as corresponding to the second vehicle based on the searching of public motor vehicle records stored by the selected second state vehicle registration system;

use the identified second public motor vehicle record to electronically search the billing database to identify the account record for the second user associated with the second vehicle;

access from the account record for the second user, the preferred toll payment method selected by the second user;

calculate a toll fee for the second transaction event based on the second particular distance traveled by the second vehicle; and request payment of the toll fee corresponding to the second transaction event from the second user in accordance with the accessed preferred toll fee payment method selected by the second user.

10. The method of claim 1,
wherein the preferred toll fee payment method selected by the user indicates a preference to pay tolls on a periodic basis, and
wherein requesting payment of the toll fee corresponding to the transaction event from the user comprises requesting payment of the toll fee at the next pay period.

11. The method of claim 1,
wherein the preferred toll fee payment method selected by the user indicates a preference to pay tolls when a predefined aggregate toll fee amount has been reached,
further comprising determining an aggregate toll fee by aggregating the toll fee corresponding to the transaction event with toll fees for the vehicle that were previously incurred but not yet billed;
further comprising determining whether the aggregate toll fee satisfies the predefined aggregate toll fee amount, and
wherein requesting payment of the toll fee corresponding to the transaction event from the user comprises requesting payment of the toll fee conditioned on determining that the predefined aggregate toll fee amount has been reached.

12. The system of claim 5, wherein the preferred toll fee payment method selected by the user indicates a preference to pay tolls on a periodic basis, and
wherein the computer system is configured to request payment of the toll fee corresponding to the transaction event from the user by requesting payment of the toll fee at the next pay period.

13. The system of claim 5,
wherein the preferred toll fee payment method selected by the user indicates a preference to pay tolls when a predefined aggregate toll fee amount has been reached,
wherein the computer system is further configured to determine an aggregate toll fee by aggregating the toll fee corresponding to the transaction event with toll fees for the vehicle that were previously incurred but not yet billed;
wherein the computer system is further configured to determine whether the aggregate toll fee satisfies the predefined aggregate toll fee amount, and
wherein the computer system being configured to request payment of the toll fee corresponding to the transaction event comprises the computer system being configured to request payment of the toll fee conditioned on determining that the predefined aggregate toll fee amount has been reached.

14. The method of claim 1, further comprising enabling the user to perceive, on the website, multiple preferred toll fee payment methods, and
wherein receiving the selection of the preferred toll fee payment method from the user comprises receiving the selection in response to the user selecting, through interacting with the website, the preferred toll fee payment method from among the multiple preferred toll fee payment methods.

15. The method of claim 14, wherein enabling the user to perceive, on the website, multiple preferred toll fee payment methods includes enabling the user to perceive a first toll fee payment method that requests toll fee payments on a periodic basis and a second toll fee payment method that requests payment of toll fees when a predefined toll fee amount has been reached.

16. The method of claim 1, further comprising updating account information in the account record for the user to indicate the determined toll fee for which payment is due.

17. The method of claim 16, further comprising enabling the user to subsequently access the website and to interact with the website to perceive the updated account information.

18. The method of claim 1, further comprising enabling the user to subsequently access the website and to interact with the website to update account information in the account record by changing the selected preferred toll fee payment method to a new preferred toll fee payment method.

19. The method of claim 1, further comprising enabling the user to subsequently access the website and to interact with the website to review account information that includes a toll fee payment history for the user.

20. The method of claim 1, wherein the vehicle sensor comprises one or more of a wire loop embedded in the road, a through-beam sensor that emits a continuous beam across the toll road, and optical sensors.

21. The system of claim 5, wherein the computer system is further configured to enable the user to perceive, on the website, multiple preferred toll fee payment methods, and
wherein the computer system being configured to receive the selection of the preferred toll fee payment method from the user comprises the computer system being configured to receive the selection in response to the user selecting, through interacting with the website, the preferred toll fee payment method from among the multiple preferred toll fee payment methods.

22. The system of claim 21, wherein the computer system being configured to enable the user to perceive, on the website, multiple preferred toll fee payment methods includes the computer system being configured to enable the user to perceive a first toll fee payment method that requests payment of toll fee payments on a periodic basis and a second toll fee payment method that requests toll fees when a predefined toll fee amount has been reached.

23. The system of claim 5, wherein the computer system is further configured to update account information in the account record for the user to indicate the determined toll fee for which payment is due.

24. The system of claim 23, wherein the computer system is further configured to enable the user to subsequently access the website and to interact with the website to perceive the updated account information.

25. The system of claim 5, wherein the computer system is further configured to enable the user to subsequently access the website and to interact with the website to update account information in the account record by changing the selected preferred toll fee payment method to a new preferred toll fee payment method.

26. The system of claim 5, wherein the computer system is further configured to enable the user to subsequently access the website and to interact with the website to review account information that includes a toll fee payment history for the user.

27. The system of claim 5, wherein the vehicle sensor comprises one or more of a wire loop embedded in the road, a through-beam sensor that emits a continuous beam across the toll road, and optical sensors.

* * * * *

UNITED STATES PATENT AND TRADEMARK OFFICE
CERTIFICATE OF CORRECTION

| | | |
|---|---|---|
| PATENT NO. | : 8,660,890 B2 | |
| APPLICATION NO. | : 12/367189 | |
| DATED | : February 25, 2014 | |
| INVENTOR(S) | : Jay E. Hedley | |

It is certified that error appears in the above-identified patent and that said Letters Patent is hereby corrected as shown below:

In the Claims

In claim 5, column 18, line 63, delete "referred" and insert -- preferred --, therefor.

In claim 9, column 21, line 13, delete "access" and insert -- access, --, therefor.

Signed and Sealed this
Twenty-seventh Day of May, 2014

Michelle K. Lee
*Deputy Director of the United States Patent and Trademark Office*